Nov. 17, 1959     H. A. BARBER ET AL     2,913,710
INDICATOR AND SHUT-OFF FOR AGGREGATE BINS
Filed May 14, 1957     6 Sheets-Sheet 1

Inventors
HARRY A. BARBER
BRUCE M. ROSS

Nov. 17, 1959   H. A. BARBER ET AL   2,913,710
INDICATOR AND SHUT-OFF FOR AGGREGATE BINS
Filed May 14, 1957   6 Sheets-Sheet 4

Inventors
HARRY A. BARBER
BRUCE M. ROSS

Nov. 17, 1959 H. A. BARBER ET AL 2,913,710
INDICATOR AND SHUT-OFF FOR AGGREGATE BINS
Filed May 14, 1957 6 Sheets-Sheet 5

Inventors
HARRY A. BARBER
BRUCE M. ROSS

Inventors
HARRY A. BARBER
BRUCE M. ROSS

United States Patent Office 2,913,710
Patented Nov. 17, 1959

2,913,710

INDICATOR AND SHUT-OFF FOR AGGREGATE BINS

Harry A. Barber and Bruce M. Ross, Aurora, Ill., assignors to Barber-Greene Company, Aurora, Ill., a corporation of Illinois Application May 14, 1957, Serial No. 659,045

15 Claims. (Cl. 340—246)

This invention relates to batch plant controls and more particularly to a simplified form of indicator and shut-off mechanism for so-called aggregate bins.

In previous controls for aggregate bins, such as are used in bituminous batch plants, bellows or propellers have been utilized in the bins responsive to aggregate or gravel level for effecting the desired control in the operation of the gate valves and the control of the batching cycle. Such previous types of level responsive controls, for the most part, involved the use of electrical circuits rather than a simple, visible and easily adjustable mechanical structure on the exterior of the bins which would be readily accessible for repair and maintenance as in the present invention.

In the previous bellows type controls, the bellows was usually located along the side of the bin or compartment where the gravel or aggregate could pile up without there being any gravel delivered to the pug mill. We have ascertained that the most effective location to have the level responsive element is near or at the center of the bin or compartment.

In the propeller type of structure, the propeller was usually located in the middle of the compartment where it was at all times driven by an electric motor until the aggregate built up to a level so as to stop the turning of the propeller. Here, however, the control was coordinated with other parts of the batch plant by electrical circuits rather than by simple, visible mechanical devices that can be easily adjusted, repaired or maintained.

The present structure at all times makes it possible to ascertain instantly the condition of the level of aggregate in any one of a multiple of bins and is exceedingly easy and simple to adjust.

An object, therefore, of this invention is to provide a simplified and more effective indicator and shut-off for aggregate bins and the like and which is exceedingly economical to maintain and adjust.

Another object of this invention is to utilize a simple arcuate member, such as a wheel, so disposed in the bin that it will at all times frictionally respond to the material as it is being built up in the bin to maintain the desired adjustment of the other mechanisms involved in the operation of the batch plant and will at the same time give foolproof indication of the level of the material at all times in the bin.

In accordance with the general features of this invention, there is provided in a control system for a plurality of adjoining bins containing particulated material, a plurality of material level responsive ratchet-like elements there being at least one disposed in the interior of each bin, each element having a substantially arcuate peripheral edge against which material building up in the bin is adapted to impinge to arrest indexing of the element, and mechanism on the exterior of the bins including an oscillatory bar common to all of said elements for indexing same and tiltable switch means, including at least one switch for each element actuable by said bar in one direction when the associated element is being indexed and in an opposite direction when the motion of the element is arrested.

Another feature of the invention relates to the provision of a new level responsive method for affording visible level indication as well as effecting control or use of mechanism associated with the material being discharged from the bin.

Other objects and features of this invention may more fully appear from the following detailed description taken in connection with the accompanying drawings which illustrate several embodiments and in which—

As shown on the drawings.

The drawings in the present case show only a fragment of a new batch plant, which plant is shown in more detail in co-pending Harry A. Barber and James F. Sauer applications, Serial Nos. 533,284 and 533,285, filed on September 9, 1955, and James F. Sauer application, Serial No. 558,434, filed on January 11, 1956.

Figure 1:
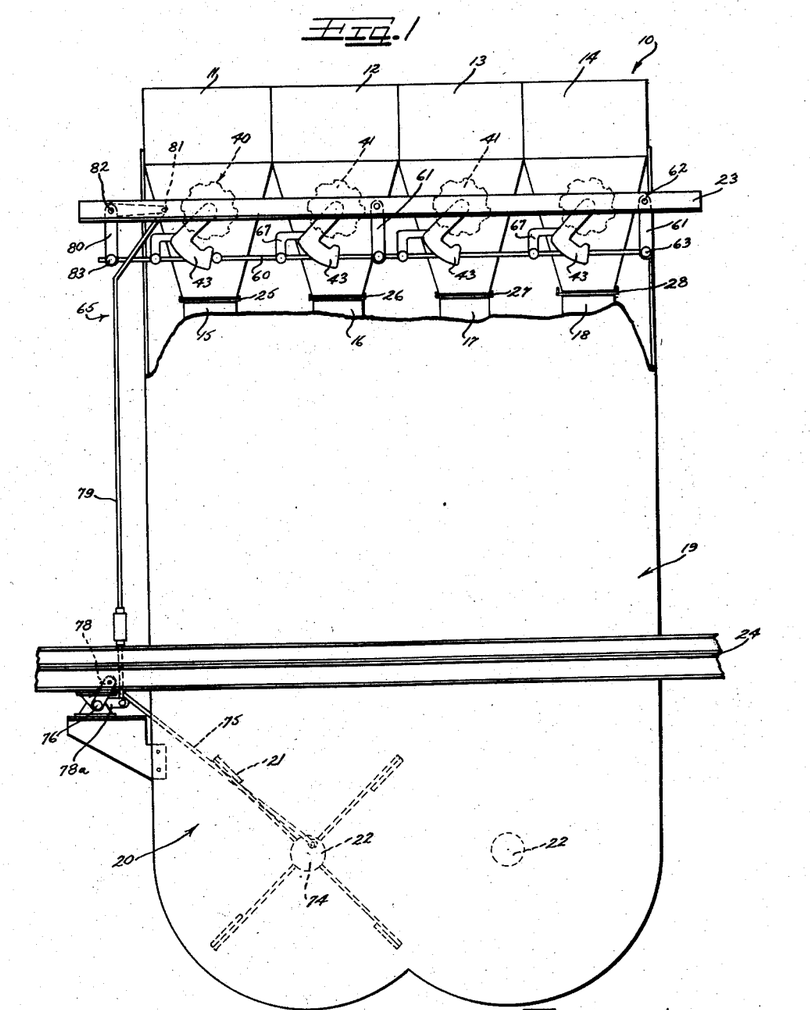
Figure 1 is a fragmentary side elevation of a portion of a batch plant showing the coordination of level control elements in a series of bins involved in the plant and the interrelationship of the same with a pug mill drive shaft.

A bituminous batch plant 10 is diagrammatically shown in the drawings and particularly in Figure 1 including generally a plurality of storage bins 11, 12, 13 and 14 of a hopper-like form converging toward the lower ends thereof for discharging aggregate into a plurality of aligned aggregate measuring bins 15, 16, 17 and 18, which measuring bins are carried in a drop bottom weigh hopper 19, as shown in greater detail in the co-pending applications. Disposed below the weigh hopper for receiving the materials from the measuring bins is a pug mill 20 having a plurality of paddles 21 therein. The paddles 21 are connected to a drive shaft 22 which may be driven by any suitable means. Suitable means may be provided, such as shown in the co-pending applications, for supplying asphalt to the pug mill. Also, aggregate and asphalt scales (not shown) may be utilized to accurately measure the amount of aggregate and asphalt to be discharged into the pug mill. Suitable beam supports 23 and 24 are provided for maintaining indicator mechanism adjacent the bins 11—14, the weigh hopper 19 and the pug mill 21 in predetermined vertical position with respect thereto.

Disposed between each of the storage bins 11—14 and the measuring bins 15—18 are strike-off gates 25, 26, 27 and 28. The gates are shown in more detail in the co-pending application, Serial No. 533,284. The gates 25—28 are operated by means of a hydraulic valve 29 (Figure 15) which has supply lines 30 connected to a suitable pump (not shown). The hydraulic valve may be of any suitable construction and has fluid lines 31 and 32 connected to opposite sides of a piston operated cylinder 33. The cylinder 33 has a piston rod 34 which is suitably connected to the gates 25—28.

The present invention concerns itself with the provision of a novel bin indicator apparatus indicated generally by the reference numeral 40.

The bin indicator apparatus is a combination mechanical and electrical device which will indicate the height of material in a given bin and will also shut off or start electrically, various units on the plant which depend upon an adequate supply of material in each bin which is described in further detail in the aforementioned co-pending applications.

The bin indicator apparatus includes a notched wheel 41 located inside each of the storage bins 11—14, which wheel moves constantly with a back and forth movement when the bin is empty or when material is below the wheel 41. Means in the form of one or more mercury switches 42 are carried on a pair of indicator arms 43—43 associated with each storage bin. The switches 42 serve to indicate the aggregate condition in the storage bins by turning on lights and by operating electrical devices which prevents some machinery in the plant from operating until the level of the bins having deficient aggregate is sufficient to prevent the wheel 41 from turning.

In the illustrated embodiment, there are four indicators or wheels 41 on the batch plant, one for each bin and when material is low in any bin, the indicator will function and stop weighing operations in the plant until the bin or bins have a sufficient supply of material to permit suitable operation.

Bin indicator assembly detail

Figure 2:
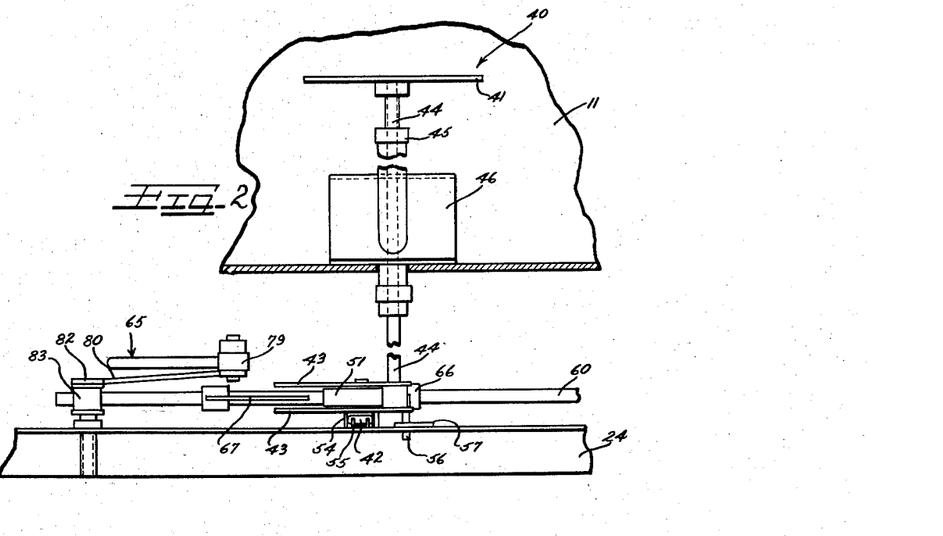
Figure 2 is a fragmentary horizontal cross-sectional view through a portion of one of the bins showing a level responsive element and wheel and its connection to leverage mechanism including the pug mill actuated reciprocating bar.

Preferably, the notched wheel 41 is disposed generally in the center of the storage bin and relatively close to the discharge end of the storage bin so that the wheel may at all times accurately respond to the aggregate condition in the bin. Excellent results have been found by constructing the wheel approximately one-fourth inch thick and with an outside diameter of approximately ten inches. The wheel 41 is fixed to a shaft 44, which shaft extends through a sleeve 45 exteriorly of the storage bin 11 (Figure 2). A mounting bracket 46 is provided for attaching the sleeve 45 to the inside wall of the storage bin 11 and the sleeve 45 extends through the mounting bracket 46 and through the wall of the storage bin.

Figure 3:
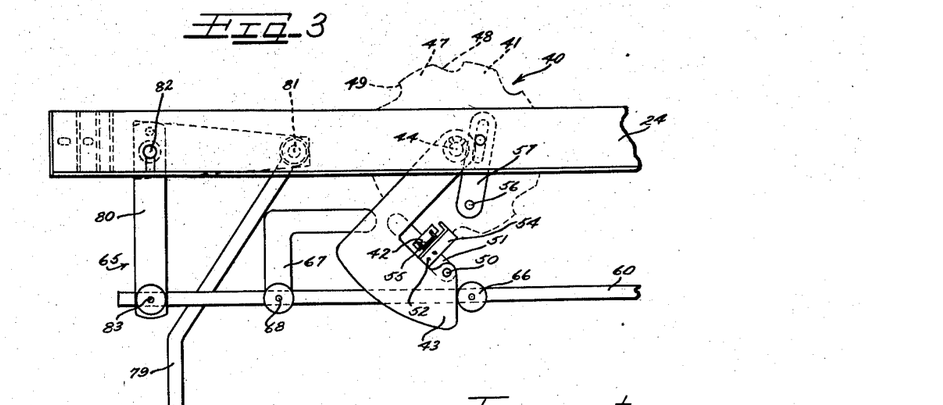
Figure 3 is a fragmentary side view of the level responsive mechanism shown in Figure 2 with the bin removed, it being undersood that this mechanism is substantially the same for each of the bins.

The wheel 41 is provided with a series of circumferentially disposed teeth 47 which resemble ratchet or rip saw teeth and the teeth are separated from one another by notches. The wheel 41 is assembled on the shaft so that a tapered side 48 of the tooth moves into the material when the indicator arm 43 is pulled back. A blunt edge 49 (Figure 3) of the tooth 47 is adapted to dig into the material and help to prevent the indicator arm 43 from moving forward. In other words, the wheel teeth operate similar to a ratchet.

The interior arms 43—43 are affixed in spaced relation to the outside end of the wheel shaft 44 and movement imparted to the indicator arms is thereby imparted to the wheel 41. Disposed between the arms 43—43 and swingably carried on link pin 50 (Figure 3) is a swinging switch arm 51. Suitably attached at one side of the switch arm 51 by means of screws 52 or the like is a bracket 54. The brackets 54 serve to carry the mercury switch elements 42 by means of clips 55. It will be appreciated that a suitable number of clips and mercury switch elements may be carried on the swinging switch arm 51. Associated with each of the pairs of indicator arms 43 is a stop pin 56. The stop pin 56 is mounted on a stop pin arm 57, which arm is carried by the supporting beam 24.

Crank arm mechanism detail

Disposed between the pairs of indicator arms 43 and extending alongside of the bins 11—14 is a push rod 60. The push rod is supported along its length by push rod pivot arms 61. The push rod pivoted arms are pivotally connected at 62 with the supporting frame 23 and they are pivotally connected at 63, the opposite end, to the push rod 60.

Indicated generally at 65 is provided a crank arm mechanism for reciprocating the push rod 60. The motion of the push rod 60 is transmitted to the indicator arms 43 through the push blocks 66 which are mounted along the length of the push rod 60.

Also fixedly mounted on the push rod 60 along the length thereof, and between each pair of indicator arms 43 are switch pivot push arms 67. When the bin contains enough material to stop the motion of the wheel and indicator arms 43, the push arm 67 moves forward with the reciprocating action of the push rod 60 and moves the switch pivot arm 51 to a forward position. The switch pivot arm 51 finally comes to rest against the stop pin 56, thus changing the position of the mercury switch 42 and completing the circuit.

Figures 4, 15:
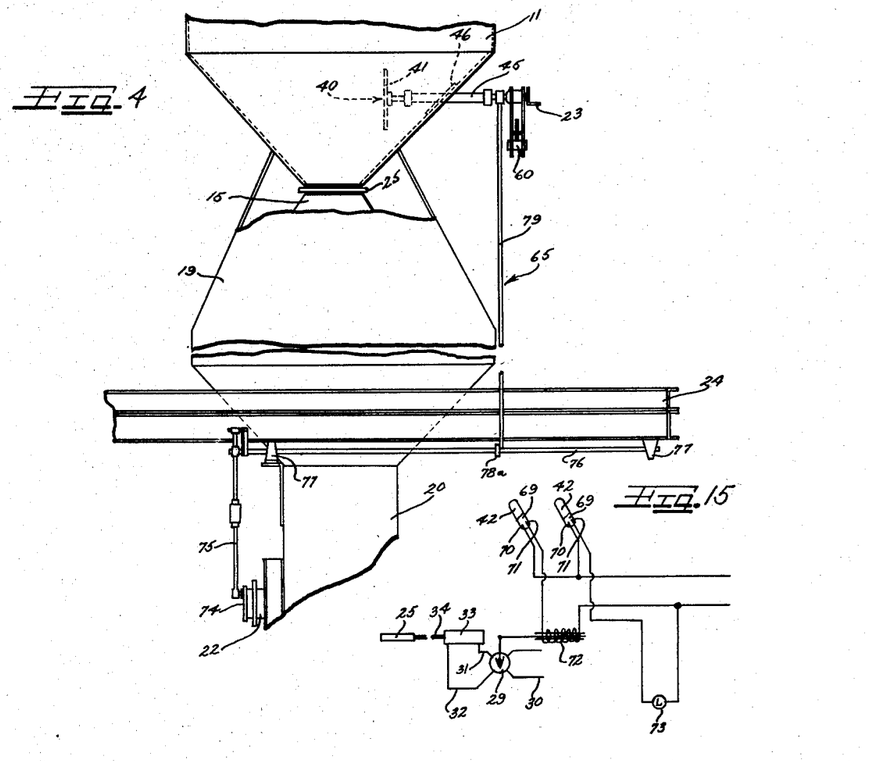
Figure 4 is a fragmentary end view of the structure shown in Figure 1.
Figure 15 is a diagrammatic view of the circuit, in its simplest form, which is used with the mercury switches operated by each of the level responsive elements showing one for effecting energizing of an indicator light and the other for controlling a solenoid operated hydraulic valve.

The closed position of the mercury switches 42 is shown in Figure 15 wherein the circuit is closed when mercury 69 in the tube falls against the spaced contacts 70 and 71. Thus, when a bin becomes empty, the mercury switches go to the "on" position. One of these switches energizes a solenoid 72 which controls the hydraulic valve 29 which, in turn, through the piston rod 34 holds the sliding strike-off gates open and stops the batching cycle. The strike-off gates may be maintained open until all of the measuring bins 15—18 are full and aggregate is above the bin indicators 41 and all of the storage bins 11—14. As soon as the aggregate in the storage bins is returned to a satisfactory level, the bin indicator switch moves to the "off" position and the batching cycle continues as will be hereinafter described in further detail.

The other mercury switch is in circuit with a signal light, which light is disposed at an operator's station and goes on to indicate when the bin is empty. Preferably, a light 73 is provided for each of the storage bins.

The suitable connecting lines illustrated in Figure 15 connecting the mercury switches 42—42 with the solenoid 72 and the light 73 are connected to a source of power.

The crank arm 80 actuates the push rod 60. Motion is imparted to the crank arm 80 from an eccentric 74 (Figure 4) mounted on the end of one of the pug mill shafts 22.

The eccentric 74 is connected by means of a push rod 75 to a counter-shaft 76 which is carried by hanger arms 77 on the support 24. More specifically, the push rod 75 is connected to a crank arm 78 which is, in turn, connected to the counter-shaft 76. A second crank arm 78a is also disposed on the counter-shaft 76 and a second push rod 79 is connected to the free end of the crank 78a at one end and the push rod 79 is connected at its other end to a bell crank lever 80 at 81 (Figure 1). The bell crank lever 80 is pivotally connected at 82 to the support 23 with the other arm of the bell crank connected at 83 to the push rod 60. It will be noted the hanger arm 61 and the bell crank 80 swing on the same radius.

In the operation of the crank arm mechanism, the eccentric motion is transmitted from one side of the plant to the other side by means of the counter-shaft 76. The crank arm 78a, the push rod 79 and the bell crank 80 serve to transmit the eccentric motion from the counter-shaft to the push rod 60.

Figures 14, 16:
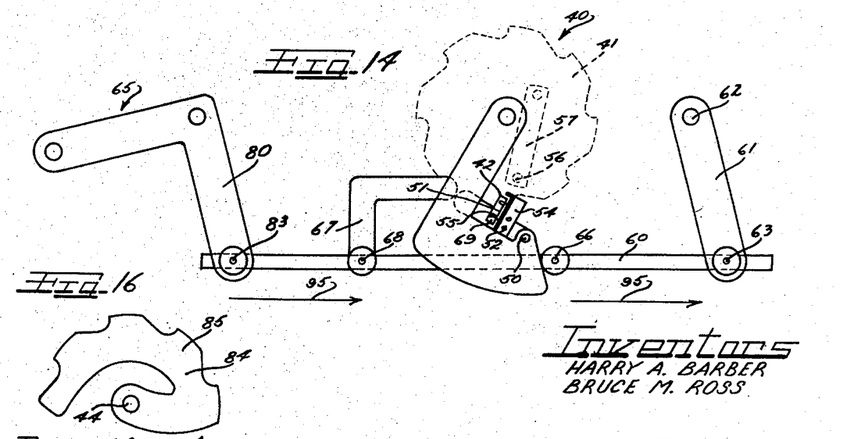
Figure 16 is a more or less diagrammatic view showing a modification of the level responsive element or wheel.

Shown in Figure 16 is a modified wheel construction in the form of an arcuate arm 84 having ratchet-like teeth 85. When utilizing an arcuate arm or a half-wheel in place of a full wheel, the half wheel or the arcuate arm must be configurated to give the desired amount of resistance when the aggregate rises to a predetermined level and frictionally bears against the same.

*Operation of bin indicators*

Figure 5:
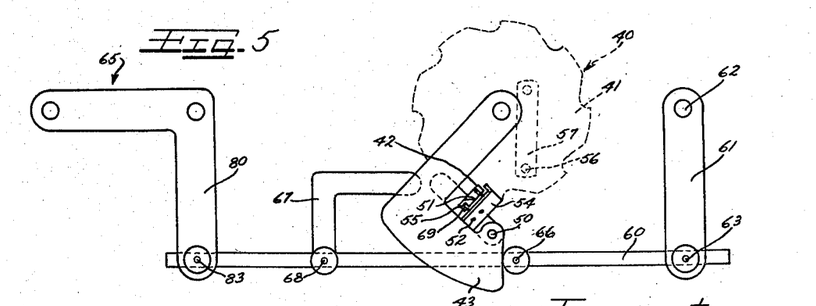
Figures 5–14, inclusive, are somewhat diagrammatic views illustrating different positions of the level responsive mechanism illustrated in Figures 2 and 3.
Figure 6:
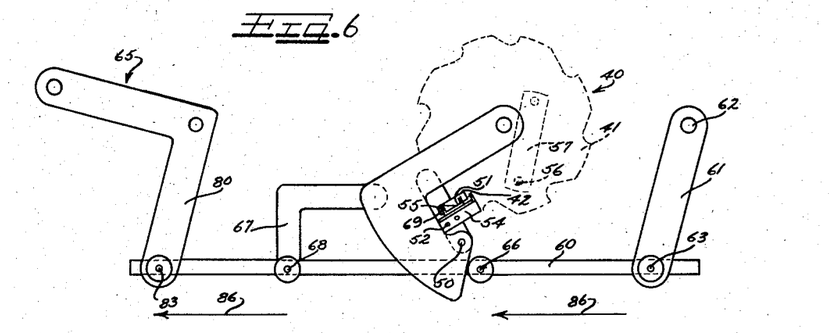
Figure 7:
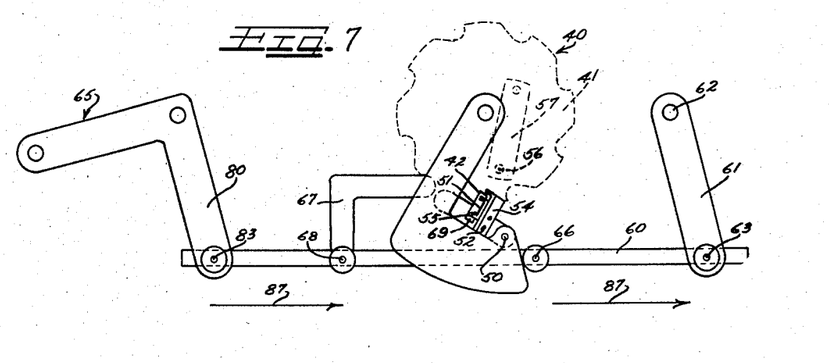

When the bin is empty, the bin indicator arms 43 are free to follow the complete movement of the push rod 60 and the bell crank 80. Figure 5 shows the push rod and the bell crank 80 in neutral position with the indicator arms 43 resting against the push block 66 on the bar or push rod 60. Figure 6 shows the bar or push rod 60 moved from right to left carrying the indicator arms 43 by means of the stop 66 as indicated by the arrows 86. Figure 7 shows the push rod 60 moved from left to right with the indicator arms 43 moving with the push block 66 as indicated by the arrows 87. This backward and forward movement of the indicator arms 46 continues as long as there is no material in the bin to create enough resistance to stop the indicator wheel 41, inside the bin. The indicator arms 43 are counter-weighted so that they will follow the push rod push block 66 over the total four and one-quarter inch movement of the crank.

Figure 8:
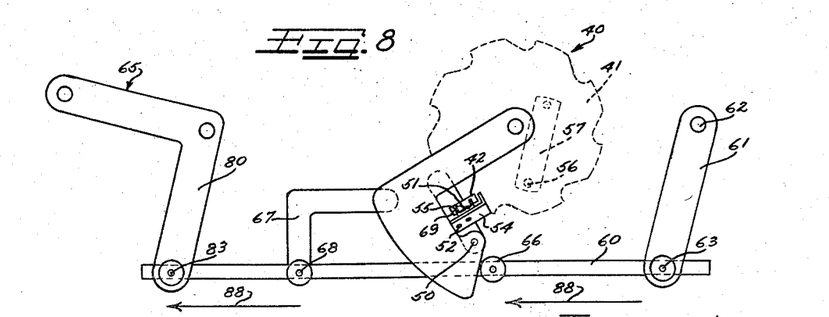

When the bin 11 fills up with aggregate, the material packs in around the wheel 41 and prevents the wheel 41 and the indicator arms 43 from moving back and forth with the bar or push rod 60. The push block 66 pushes the arms 43 completely back as shown by the arrows 88 in Figure 8. The resistance of the aggregate on the sides of the teeth of the wheel holds the arms 43 in this position as long as there is material frictionally engaged against the wheel 41.

Figure 9:
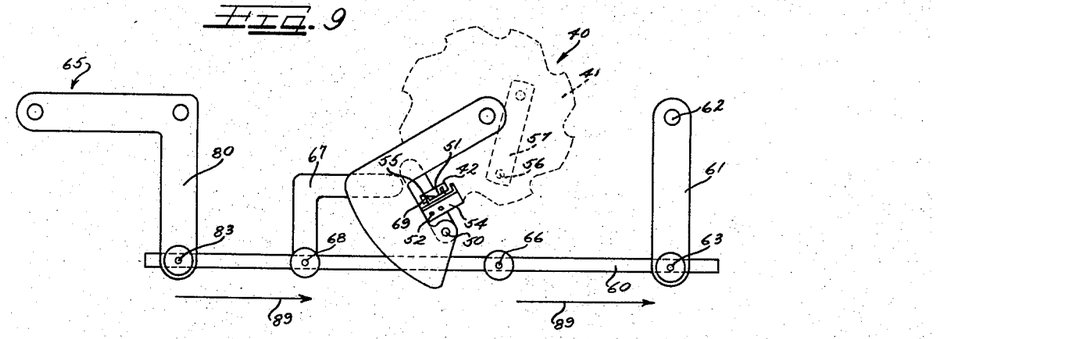
Figure 10:
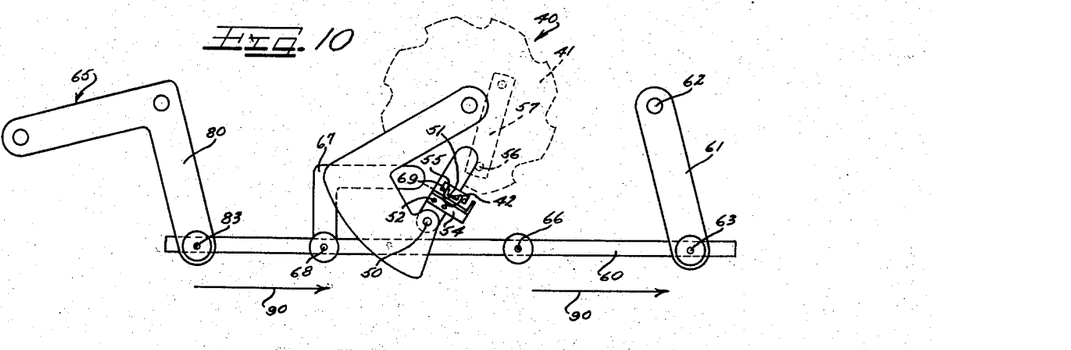
Figure 11:
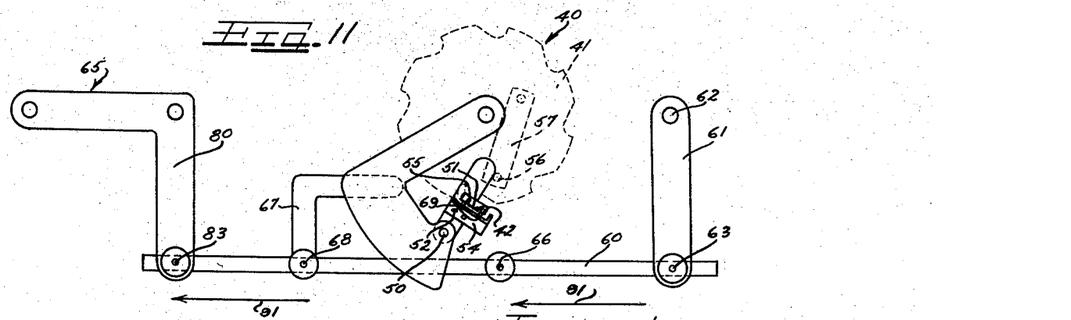
Figure 12:
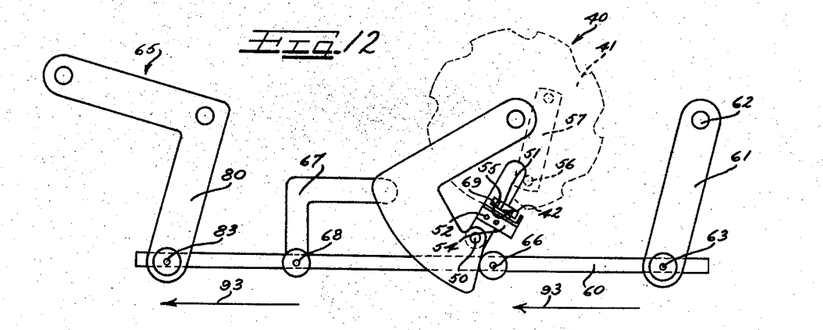

The backward and forward movement of the bar or push rod 60 does not affect the arms 43 with arrows 89 in Figure 9 illustrating the bar 60 moved to the right with the crank 80 and the hanger arm 61 at right angles to the beam 23. As is shown by arrows 90 in Figure 10, the bar 60 rocks the bell crank 80 and the hanger arms 61 on pivots 82 and 62 from the right angle position shown in Figure 9 with the switch pivot push arm 67 pushing the pivot arm 51 to a forward position resting on the switch pivot arm stop pin 50. Figure 11 by arrows 91 shows the bell crank 80 and hanger arms 61 moved to the left by bar 60 and returned to a vertical position. Figure 12, by arrows 92, shows the push rod 60 moved to the left of the vertical position shown in Figure 11. As a consequence of the pivot arm 51 being tilted in an opposite direction, the mercury 69 and the mercury switch 42 is moved to the "off" position (Figures 10–12).

Figure 13:
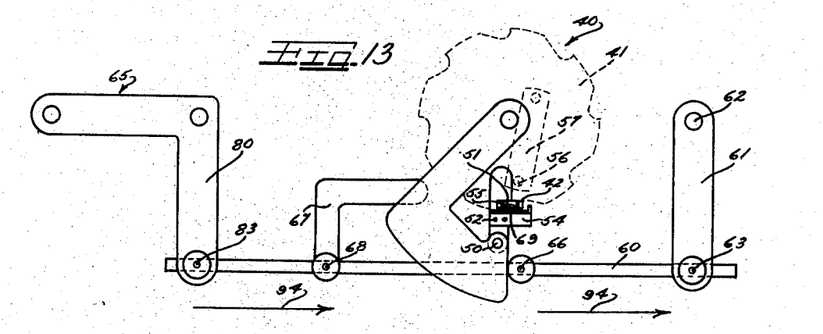

When the bin 11 becomes empty of material, there is no longer any aggregate to prevent the wheel from moving, so the indicator arms 43 again follow the push block 66. As the indicator arms 43 move forward, the switch pivot arm 51 is pushed by the stop pin 56 (Figures 13 and 14) and finally the switch pivot arm falls completely in the back position, thus moving the mercury 69 in the mercury switch 42 to the "on" position. Figure 13 by the arrows 94 show the left to right movement of the push bar 60 with the bell crank and hanger arms in a vertical position. Arrows 95 show the push bar 60 moved further to the left with the switch 42 turned "on."

The mercury switch 42 stays in the "on" position and the indicator arms 43 follow the complete movement of the crank and push rod, as shown in Figures 14, 5, 6, 7 and 8, until the bin 11 again fills with aggregate and stops the indicator arms 43 and the wheel 41 and the mercury switch 42 is again moved to the "off" position as shown in Figures 9–12.

It will be understood that modifications and variations may be effected without departing from the scope of the novel concepts of the present invention.

We claim as our invention:

1. In a control system for a plurality of adjoining bins containing particulated material, a plurality of material level responsive ratchet-like elements there being at least one disposable in the interior of each bin, each element having a substantially arcuate peripheral edge against which material building up in the bin is adapted to impinge to arrest indexing of the element, and mechanism disposable on the exterior of the bins including an oscillatory bar common to all of said elements for indexing same, and tiltable switch means including at least one switch for each element actuable by said bar in one direction when the associated element is being indexed and in an opposite direction when the motion of the element is arrested.

2. In a control system for a plurality of adjoining bins containing particulated material, a plurality of material level responsive ratchet-like elements there being at least one disposable in the interior of each bin, each element having a substantially arcuate peripheral edge against which material building up in the bin is adapted to impinge to arrest indexing of the element, and mechanism disposable on the exterior of the bins including an oscillatory bar common to all of said elements for indexing same, and tiltable switch means including at least one switch for each element actuable by said bar in one direction when the associated element is being indexed and in an opposite direction when the motion of the element is arrested, said mechanism including a weighted arm connected to and movable with said element and on which said switch is pivotally carried and said bar having a projection engageable on one side of said arm upon each change of direction of movement of said bar when the bin is empty so that arm moves back and forth freely with the bar, said bar also carrying an arm for engaging and tilting said switch when the weighted arm is held against movement with the bar by the friction of the aggregate against the ratchet-like element.

3. In a batch plant structure, a mixing bin containing a paddle wheel, a paddle wheel drive shaft driving the paddle wheel, a plurality of adjoining bins containing particulated material for disposal in the mixing bin, at least one material level responsive ratchet-like element in the interior of at least one of said bins, said element having a substantially arcuate peripheral edge against which material building up in the bin is adapted to impinge to frictionally arrest indexing of the element, mechanism on the exterior of the bins including a reciprocating push rod cooperable with said element for indexing same, switch means including at least one tell tale electrical signal for said element actuated by the movement of said rod upon the material level falling to reduce sufficiently the frictional engagement between the element and the material, and means for reciprocating said push rod driven by the paddle wheel drive shaft.

4. In a control system for a plurality of adjoining bins containing particulated material, at least one material level responsive element disposable in the interior of at least one of said bins, mechanism disposable on the exterior of the bins including a reciprocating push rod cooperable with said element for rocking same, switch means including at least one tell tale electrical signal for said element actuated by the movement of said rod upon the material level falling sufficiently to permit the element to be rocked, said signal including a tilt-type switch, and a weighted arm carried by said rod and movable back and forth with said element when the friction between the element and the material is sufficiently arrested and with said switch carried by said arm.

5. In a control system for a plurality of adjoining bins containing particulated material, at least one material level responsive element disposable in the interior of at least one of said bins, mechanism disposable on the exterior of the bins including a reciprocating push rod cooperable with said element for rocking same, switch means including at least one tell tale electrical signal for said element actuated by the movement of said rod upon the material level falling sufficiently to permit the element to be rocked, said signal including a tilt-type switch, a weighted arm connected to and movable back and forth with said element only when the friction between the element and the material is sufficiently arrested and with said switch carried by said arm, and a projection engaged against said arm upon each change of direction of movement of said rod when the bin is empty so that the arm moves back and forth freely with the push rod and for cocking said arm when said element is arrested, said push rod carrying means for engaging and tilting said tilt-type switch when the weighted arm is released.

6. In a control system for a batch plant and the like, a plurality of adjoining bins containing particulated material, level responsive means disposed in the interior of each bin, and mechanism on the exterior of the bins including an oscillatory bar common to all of said means for actuating the level responsive means, and tiltable switch means including at least one signal switch cooperable with each of said means actuable by said bar and cooperable with said level responsive means to give off a signal upon the particulated material falling below a predetermined level.

7. In combination, a control system and a plurality of adjoining bins containing aggregate material for a batch plant, the control system including a movable element disposed in each of the bins, means comprising a push rod for moving said elements when said bins are empty and with the movement of the elements being arrested upon the aggregate reaching a predetermined level and being frictionally engaged against said elements, the movable elements being connected to said push rod along its length, and signal means between said elements and said means for giving off a signal when any one of the bins falls below the predetermined level.

8. In combination, a control system and a plurality of adjoining bins containing aggregate material for a batch plant, the control system including a movable element disposed in each of the bins, means comprising a push rod disposed externally of said bins for moving said elements when said bins are empty and with the movement of the elements being arrested upon the aggregate reaching a predetermined level and being frictionally engaged against said elements, the movable elements being connected to said push rod along its length, and signal means between said elements and said means for giving off a signal when any one of the bins falls below the predetermined level and with the signal means indicating which of the bins has an insufficient level of aggregate.

9. In combination, a control system and a plurality of adjoining bins containing aggregate material for a batch plant, the control system including at least one aggregate level responsive element in the interior of at least one of said bins, rocking mechanism on the exterior of the bins including a reciprocating push rod cooperable with said element for rocking same, means for rocking said rod, switch means including at least one tell tale electrical signal for said element actuated by the movement of said rod upon the material level falling to permit the element to again rock, said signal including a tilt-type switch, a weighted arm fixedly connected to and movable with said element and with said switch carried by said arm, and a projection on said rod engaged against said arm upon each change of direction of movement of said rod when the bin is empty so that the arm moves back and forth freely with the push rod and for cocking said arm and tilting said switch when said element is arrested, said rod carrying means for upsetting the tilted switch when the weighted arm is released upon the aggregate level falling and releasing the element.

10. In a batch plant having a plurality of adjoining bins for aggregate material, aggregate level responsive elements in the interior of said bins, rocking mechanism on the exterior of the bins including a reciprocating push rod with said elements being connected at spaced intervals with the rod along its length for rocking the elements, means for rocking said rod, switch means including at least one tell tale electrical signal for each of said elements which signal is actuated by the movement of said rod upon the material level falling to permit the element to again rock, said signal including a tilt-type switch, an arm fixedly connected with said level responsive elements and rocked by said rod and with said switch carried by and movable with said arm, and a projection on said rod engaged against said arm upon each change of direction of movement of said rod when the bin is empty so that the arm moves back and forth freely with the push rod and for cocking said arm and tilting said switch when said element is arrested, said batch plant having means for upsetting the tilted switch when the weighted arm is released upon the aggregate level falling and releasing the element.

11. In a batch plant including a paddle wheel for mixing aggregate material and means for driving the paddle wheel, a plurality of adjoining bins containing aggregate material disposed adjacent the paddle wheel, level responsive elements in the interior of said bins, arms mounted externally of said bins, rotatable shafts extending through said bins each supporting at one end said level responsive element and at another end said arm, rocking mechanism on the exterior of the bins including a reciprocating push rod cooperable with said arms and said elements for rocking same, means for rocking said rod driven by said means for driving the paddle wheel, switch means including at least one tell tale electrical signal for said element actuated by the movement of said rod upon the material level falling to permit the element to again rock, said signals including tilt-type switches mounted on said arms, and a means on said rod engaged against said arm upon each change of direction of movement of said rod when the bin is empty so that the arm moves back and forth freely with the push rod and for cocking said arm and tilting said switch when said element is arrested, said rod carrying means for upsetting the tilted switch when the arm is released upon the aggregate level falling and releasing the element for rocking with said push rod.

12. In a batch plant and the like, a plurality of adjoining bins containing particulated material, a series of level responsive means with one of the level responsive means being disposed in the interior of each bin, and mechanism of the exterior of the bins including an oscillatory bar with said level responsive means being connected to the oscillatory bar along its length, and a series of tiltable switch means each including one signal switch, the switches being movable with said oscillatory bar and cooperable with the series level responsive means to give off a signal upon the particulated material falling below a predetermined level.

13. In a batch plant, a plurality of adjoining bins containing particulated material for disposal in a mixing bin, level responsive ratchet-like elements in the interior of said bins, said element having a substantially arcuate peripheral edge against which material building up in the bin is adapted to impinge to frictionally arrest indexing of the element, mechanism disposed externally of the bins including a reciprocating push rod cooperable with each of said element for indexing same, the elements being connected to the push rod at spaced intervals along its length, switch means including tell tale electrical signal for said elements actuated by the movement of said rod upon the material level falling to reduce sufficiently the frictional engagement between the element and the material, and means connected to the push rod for reciprocating said push rod and actuating the ratchet-like elements.

14. In a control system for a batch plant and the like, a plurality of adjoining bins containing particulated material which bins have outlet gates, each of the bins having a level responsive element and an arm joined together in assembly for comovement together, the element being disposed in the interior of each bin and the arm being disposed externally of the bin, mechanism on the exterior of the bins including an oscillatory bar with the arms being connected to the bar along its length, and switch means including at least one signal switch cooperable with each of said arms actuatable by said bar and cooperable with its associated level responsive element to give off a signal upon the particulated material falling below the element.

15. The system of claim 14 further characterized as including a mixing bin in which the adjoining bins empty their contents, the mixing bin having a mix gate, and a solenoid controlled hydraulic valve connected to said mix gate with the valve being in circuit with the signal switches whereby the mix gate is held open when the particulated material in one of the bins falls below the elements.

References Cited in the file of this patent

UNITED STATES PATENTS

| | | |
|---|---|---|
| 1,873,353 | Sperling | Aug. 23, 1932 |
| 2,792,923 | Fraubose et al. | May 21, 1957 |